United States Patent
Jung et al.

(10) Patent No.: US 9,835,883 B2
(45) Date of Patent: Dec. 5, 2017

(54) AUTOMATIC BONDING SYSTEM FOR LIQUID CRYSTAL DISPLAY DEVICE AND AUTOMATIC BONDING METHOD USING THE SAME

(71) Applicant: LG DISPLAY CO., LTD., Seoul (KR)

(72) Inventors: Wan Woo Jung, Daegu (KR); Seung Lyul Lee, Paju-si (KR); Chun Il Kim, Goyang-si (KR); Chang Yeol Park, Paju-si (KR); Seung kil Lee, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 198 days.

(21) Appl. No.: 14/135,101

(22) Filed: Dec. 19, 2013

(65) Prior Publication Data

US 2014/0182780 A1    Jul. 3, 2014

(30) Foreign Application Priority Data

Dec. 31, 2012    (KR) ........................ 10-2012-0158721

(51) Int. Cl.
   *B32B 37/00*    (2006.01)
   *G02F 1/13*    (2006.01)
   (Continued)

(52) U.S. Cl.
   CPC .......... *G02F 1/1303* (2013.01); *B32B 37/003* (2013.01); *B32B 37/1054* (2013.01);
   (Continued)

(58) Field of Classification Search
   CPC .. B32B 37/003; B32B 37/1054; G02F 1/1303
   See application file for complete search history.

(56) References Cited

U.S. PATENT DOCUMENTS

| | | | |
|---|---|---|---|
| 2001/0053648 A1* | 12/2001 | Furukawa | B32B 17/06 445/24 |
| 2002/0062787 A1* | 5/2002 | Hashizume | B32B 38/1841 118/664 |

(Continued)

FOREIGN PATENT DOCUMENTS

| | | |
|---|---|---|
| CN | 1804694 A | 7/2006 |
| CN | 101763951 A | 6/2010 |

(Continued)

*Primary Examiner* — Daniel McNally
(74) *Attorney, Agent, or Firm* — Dentons US LLP (57) ABSTRACT

Disclosed is an automatic bonding system for an LCD device. The automatic bonding system includes a bonding unit configured to perform a process of bonding a first substrate to a second substrate, a first substrate supply unit configured to include an inverting arm and supply the first substrate to the bonding unit, a second substrate supply unit configured to include an adhesive resin coating unit and supply the second substrate to the bonding unit, a pre-hardening unit configured to perform a process of pre-hardening an adhesive resin that adheres the first and second substrates, and a hardening unit configured to perform a process of hardening the adhesive resin that adheres the first and second substrates. A gap between the first and second substrates bonded to each other by the bonding unit is a bonding gap controlled by a gap variable control stage.

5 Claims, 7 Drawing Sheets

(51) Int. Cl.
  *B32B 37/10* (2006.01)
  *G02F 1/1333* (2006.01)
  *B32B 37/12* (2006.01)
  *B32B 39/00* (2006.01)

(52) U.S. Cl.
  CPC ........... *B32B 37/1284* (2013.01); *B32B 39/00* (2013.01); *B32B 2457/208* (2013.01); *G02F 1/13338* (2013.01); *Y10T 156/1744* (2015.01)

(56) References Cited

U.S. PATENT DOCUMENTS

| | | | |
|---|---|---|---|
| 2004/0016506 A1* | 1/2004 | Sakayori | B32B 17/10018 156/291 |
| 2008/0188157 A1* | 8/2008 | Tashiro | G02F 1/1303 445/25 |
| 2011/0155317 A1* | 6/2011 | Shinoda | B32B 37/10 156/275.5 |
| 2011/0214809 A1* | 9/2011 | Sugiyama | B32B 37/10 156/285 |
| 2012/0247644 A1* | 10/2012 | Usui | B32B 37/1284 156/64 |
| 2013/0288411 A1 | 10/2013 | Yu | |

FOREIGN PATENT DOCUMENTS

| | | |
|---|---|---|
| CN | 102636916 A | 8/2012 |
| JP | 2000-301550 A | 10/2000 |
| TW | 200727054 A | 7/2007 |
| TW | 200809299 A | 2/2008 |
| TW | 200829987 A | 7/2008 |
| TW | 201117947 A | 6/2011 |
| TW | 201120521 A | 6/2011 |
| TW | 201204558 A | 2/2012 |
| WO | 2011/043295 A1 | 4/2011 |
| WO | WO 2012027243 A2 * | 3/2012 ............. B32B 37/10 |

* cited by examiner

AUTOMATIC BONDING SYSTEM FOR LIQUID CRYSTAL DISPLAY DEVICE AND AUTOMATIC BONDING METHOD USING THE SAME

CROSS-REFERENCE TO RELATED APPLICATIONS

This application claims the benefit of the Korean Patent Application No. 10-2012-0158721 filed on Dec. 31, 2012, which is hereby incorporated by reference for all purposes as if fully set forth herein.

BACKGROUND OF THE INVENTION

Field of the Invention

The present invention relates to an automatic bonding system for a liquid crystal display (LCD) device and an automatic bonding method using the same.

Discussion of the Related Art

As society advances to a more information-oriented society, the display field of processing and displaying a massive amount of information is rapidly advancing, and correspondingly, various flat panel display (FPD) devices are developed and are attracting much attention.

Examples of the FPD devices include LCD devices, plasma display panel (PDP) devices, field emission display (FED) devices, electroluminescence display (ELD) devices, etc. Such FPD devices have excellent performance in terms of thinning, lightening, and low power consumption, and thus are quickly replacing the existing cathode ray tube (CRT).

Among such FDP devices, since the LCD devices realize an image by using the optical anisotropy and polarization of a liquid crystal, the LCD devices easily display a moving image, and have a good contrast ratio. Therefore, the LCD device is being actively applied to televisions (TVs), monitors, etc.

The LCD devices necessarily include a liquid crystal panel which is manufactured by coupling two substrates with a liquid crystal layer therebetween, and an internal electrical field of the liquid crystal panel changes an alignment direction of liquid crystal molecules to realize a transmittance difference.

Moreover, a touch panel enables letters or a picture to be more conveniently and accurately input, and thus is being widely applied to electronic organizers or personal information processing devices recently. Therefore, touch panel type LCD devices in which the touch panel is built into an in-plane switching type LCD device are being provided recently.

Elements stacked on the liquid crystal panel fundamentally use a colorless transparent material, but as the number of stacked elements increases, there is a limitation in maintaining a color of an image displayed by the liquid crystal panel.

Therefore, the number of elements stacked on the liquid crystal panel may be reduced as many as possible. To this end, the touch panel may be bonded to the liquid crystal panel by an adhesive, such as a double-sided tape, which is provided along an edge of each of the touch panel and the liquid crystal panel.

However, even in this case, since an air gap is formed between the touch panel and the liquid crystal panel, light is scattered due to a high optical refractive index deviation between the air gap and the liquid crystal panel to cause a degradation in a quality of an image, and structural intensity is weakened by the air gap. For this reason, the touch panel is easily damaged by external force.

SUMMARY OF THE INVENTION

Accordingly, the present invention is directed to provide an automatic bonding system for a liquid crystal display (LCD) device and an automatic bonding method using the same that substantially obviate one or more problems due to limitations and disadvantages of the related art.

An aspect of the present invention is directed to provide a touch panel type LCD device that provides a high-quality screen, easily realizes various design colors, and has an internally enhanced intensity.

Another aspect of the present invention is directed to provide an automatic bonding system for an LCD device and an automatic bonding method using the same, which quickly and precisely perform a process of bonding a touch panel to a liquid crystal panel, thus enhancing a productivity and a quality of products.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an automatic bonding system for an LCD device including: a bonding unit configured to perform a process of bonding a first substrate to a second substrate; a first substrate supply unit configured to include an inverting arm, and supply the first substrate to the bonding unit; a second substrate supply unit configured to include an adhesive resin coating unit, and supply the second substrate to the bonding unit; a pre-hardening unit configured to perform a process of pre-hardening an adhesive resin that adheres the first and second substrates; and a hardening unit configured to perform a process of hardening the adhesive resin that adheres the first and second substrates, wherein a gap between the first and second substrates bonded to each other by the bonding unit is a bonding gap controlled by a gap variable control stage.

In another aspect of the present invention, there is provided a bonding method using an automatic bonding system for an LCD device including: a) supplying a first substrate to a supporter of a bonding unit by using an inverting arm; b) coating an adhesive resin from one side surface of a second substrate in a scan scheme by using a first stage of an adhesive resin coating unit; c) supplying the second substrate with the adhesive resin coated thereon to a second stage of the bonding unit; d) transferring the second substrate, which is supplied to the second stage, to under the supporter; e) bonding the first and second substrates with the adhesive resin therebetween; f) transferring the bonded first and second substrates to a pre-hardening unit, and pre-hardening the adhesive resin with ultraviolet (UV); and g) transferring the bonded and pre-hardened first and second substrates to a hardening unit, and hardening the adhesive resin with UV.

In step e), the adhesive resin coating unit may include an adhesive resin storage tank and a slit nozzle unit that includes a spray head including one nozzle, the spray head may be provided in an approximate bar type crossing an upper portion of the liquid crystal panel, and the spray head may scan-move in one direction to coat the adhesive resin onto an entire surface except a partial border of the liquid crystal panel.

The adhesive resin coating unit may include a laser displacement sensor and a control unit that controls an amount of the adhesive resin, and measures an interval between the adhesive resin coating unit and the second substrate.

In step e), the bonding unit may include a roll and a gap block which enable respective heights thereof to be vertically adjusted, and the bonding gap may be adjusted according to a size of each of the first and second substrates.

In step e), the bonding unit may use a surface tension between the adhesive resin and the roll, and the first and second substrates may be bonded to each other according to the adhesive resin being moved along the roll when the roll is being moved along the first substrate.

In step e), the bonding unit may include a gap dispenser, and coat the adhesive resin on one side of the first substrate before the first substrate is bonded to the second substrate, thereby considerably reducing air bubbles.

In step f), the pre-hardening unit may include a UV light emitting diode (LED) configured to directly irradiate UV onto side surfaces of the bonded first and second substrates to enhance a hardening rate of the adhesive resin.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The term "on" should be construed as including a case where one element is formed at a top of another element and moreover a case where a third element is disposed therebetween.

Figure 1:
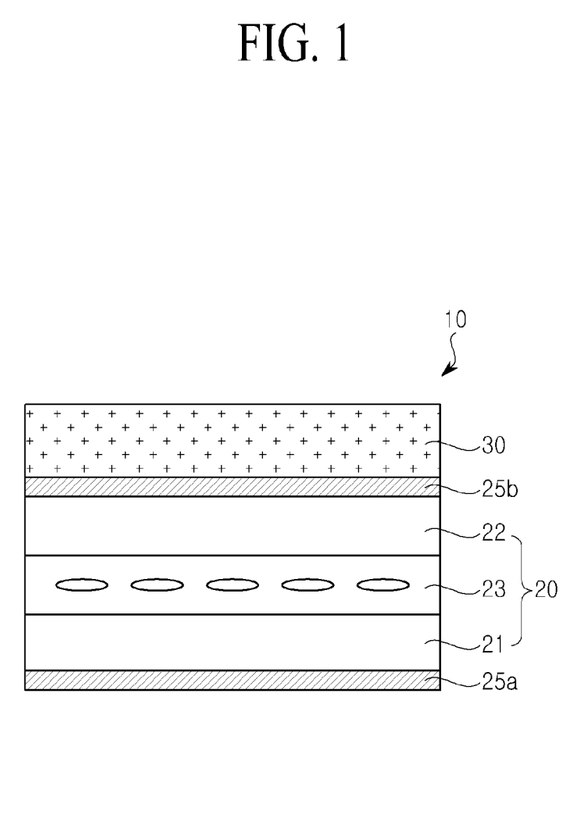
FIG. 1 is a cross-sectional view illustrating a touch panel type LCD device according to an embodiment of the present invention.

FIG. 1 is a cross-sectional view illustrating a touch panel type LCD device 10 according to an embodiment of the present invention.

As illustrated, the touch panel type LCD device 10 according to an embodiment of the present invention includes a liquid crystal panel 20 and a touch panel 30 disposed on the liquid crystal panel 20.

To provide a detailed description, the liquid crystal panel 20 includes a first substrate 21 that is an array substrate, a second substrate (a color filter substrate) 22 that faces the first substrate 21 to be separated from the first substrate 21, and a liquid crystal layer 23 that is formed between the first and second substrates 21 and 22. Although not shown, a plurality of gate lines that are formed in parallel to be separated from each other by a certain interval and a plurality of data lines, which defines a plurality of pixel areas by intersecting the plurality of gate lines, are formed on the first substrate 21. A thin film transistor (TFT) is formed at an intersection point of a corresponding gate line and data line in each of the plurality of pixel areas, and a plurality of pixel electrodes connected to the TFT through a contact hole are formed in each pixel area.

The TFT includes a gate electrode, a gate insulating layer, a semiconductor layer, a source electrode, and a drain electrode.

The plurality of pixel electrodes are separated from each other in a bar type, and are formed in each pixel area. Also, a common line and the gate line are formed in parallel on the same layer, and a plurality of common electrodes are formed in each pixel area. The plurality of common electrodes are electrically connected to the common line, and are arranged alternately with the plurality of pixel electrodes to be separated from a pixel electrode adjacent thereto.

As a modification example, one pixel electrode may be formed in each pixel electrode in a plate type. In this case, a portion of the one pixel electrode may overlap a corresponding gate line to form a storage capacitor.

When a plurality of pixel electrodes and common electrodes are formed to be separated from each other in each pixel area, the first substrate 21 is formed to operate in an in-plane switching (IPS) mode. When only a plate type pixel electrode except a common electrode is formed in each pixel area, the first substrate 21 is formed to operate in one of a twisted nematic (TN) mode, an electrically controlled birefringence (ECB) mode, and a vertical alignment (VA). In the present embodiment, the first substrate 21 operating in the IPS mode will be described as an example.

A black matrix, which has an opening corresponding to a pixel area, is formed on the second substrate 22 facing the first substrate 21. A color filter layer, including a plurality of red, green, and blue color filters which are sequentially arranged repeatedly in correspondence with a plurality of the openings, is formed on the second substrate 22.

An overcoat layer is formed on the color filter layer.

First and second polarizers 25a and 25b, which selectively transmit specific light, are adhered to respective outer surfaces of the first and second substrates 21 and 22.

The touch panel 30 is disposed on the liquid crystal panel 20.

Here, the touch panel 30 disposed on the liquid crystal panel 20 is a resistive digitizer, and includes a film type upper substrate 32 (see FIG. 2A) on which an upper electrode 35 (see FIG. 2A) is formed, a lower substrate 31 (see FIG. 2A) on which a lower electrode 33 (see FIG. 2A) is formed, and a spacer (not shown) that is formed to have a certain space between the upper substrate 32 and the lower substrate 31.

When one position of the upper substrate 32 (see FIG. 2A) is touched by an input means such as a finger 37 (see FIG. 2A) or a pen, a capacitance change occurs between the upper electrode 35 (see FIG. 2A) formed on the upper substrate 32 and the lower electrode 33 (see FIG. 2A) formed on the lower substrate 31 (see FIG. 2A), and a control apparatus reads a capacitance change value at the touched position, and calculates position coordinates according to a change in a voltage difference.

Figure 2A:
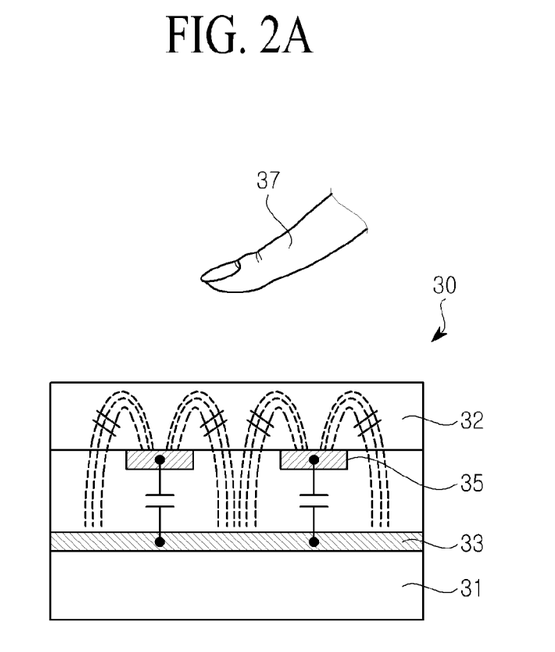
FIGS. 2A and 2B are cross-sectional view describing an operation of a touch sensor in the touch panel type LCD device according to an embodiment of the present invention.
Figure 2B:
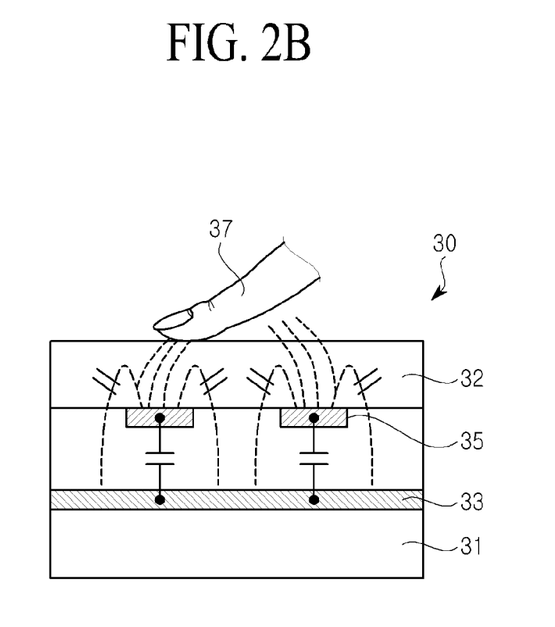

FIGS. 2A and 2B are schematic cross-sectional views describing an operation of a touch sensor in the touch panel type LCD device according to an embodiment of the present invention.

For convenience of description, only the touch panel 30 is schematically illustrated without illustrating the liquid crystal panel (20 of FIG. 1) and the first and second polarizers (25a and 25b of FIG. 1).

As illustrated in FIG. 2A, in the touch panel type LCD device (10 of FIG. 1) according to the present invention, when a surface of the upper substrate 32 of the touch panel 30 is not touched by a user's finger 37 or the like, a fringe field generated between the upper electrode 35 and the lower electrode 33 is maintained without any change, and thus, a capacitance of a capacitor is not changed, whereby an operation corresponding to a touch is not performed.

However, as illustrated in FIG. 2B, when the surface of the upper substrate 32 of the touch panel 30 is touched by the user's finger 37 or the like, the fringe field generated between the upper electrode 35 and the lower electrode 33 is changed according to the touch by the finger 37, and thus, the touch sensor senses the touch, whereby an operation corresponding to the touch is performed.

That is, the touch sensor of the touch panel 30 includes a capacitor that includes the lower electrode 33, the upper electrode 35, and a gap therebetween. In this case, when the finger 37 touches the touch panel 30, the touch sensor detects a capacitance change caused by a fringe field change of the capacitor.

The touch panel 30 may be implemented as a resistive type, an infrared type, or an ultrasound type, in addition to the capacitive type.

Here, the touch panel 30 is bonded to the liquid crystal panel (20 of FIG. 1) by an optical adhesive resin 220 (see FIG. 4), which has a high transmittance and elasticity.

The liquid crystal panel (20 of FIG. 1) and the touch panel 30 bonded to each other by the optical adhesive resin 220 (see FIG. 4) have a structure in which the optical adhesive resin 220 (see FIG. 4) elastically supports a whole bonding surface between the liquid crystal panel (20 of FIG. 1) and the touch panel 30, and thus, even though the optical adhesive resin 220 (see FIG. 4) is very thinly formed, an internal intensity sufficient for external force can be secured.

Moreover, the optical adhesive resin 220 (see FIG. 4) has the same refractive index as that of the touch panel 30 and a thin thickness, and thus, a quality of an image is not degraded due to scattering of light.

Here, an automatic bonding system 100 (see FIG. 3) performs a process of bonding the liquid crystal panel (20 of FIG. 1) to the touch panel 30 with the optical adhesive resin 220 (see FIG. 4), and thus, bonding work of the liquid crystal panel (20 of FIG. 1) and the touch panel 30 is automated. Accordingly, productivity increases, a bonding state is uniform and stable, and reliability of a product is enhanced.

Figure 3:
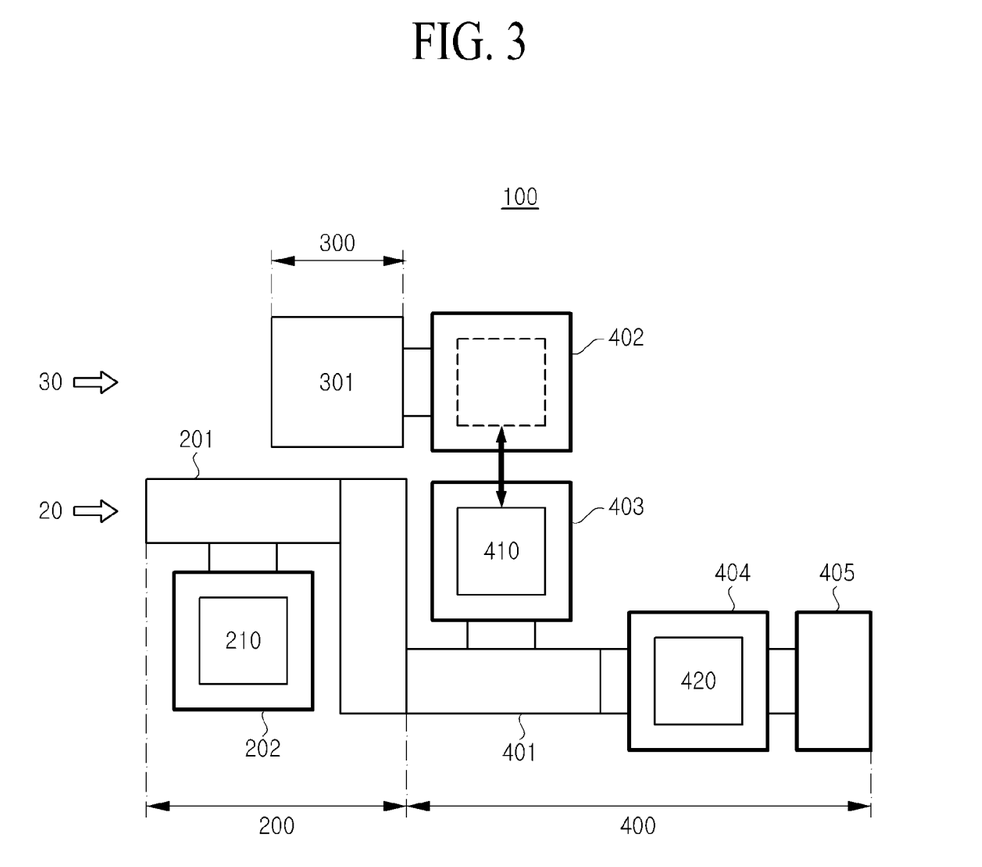
FIG. 3 is a plan view illustrating a bonding system for a liquid crystal panel and a touch panel.
Figure 4:
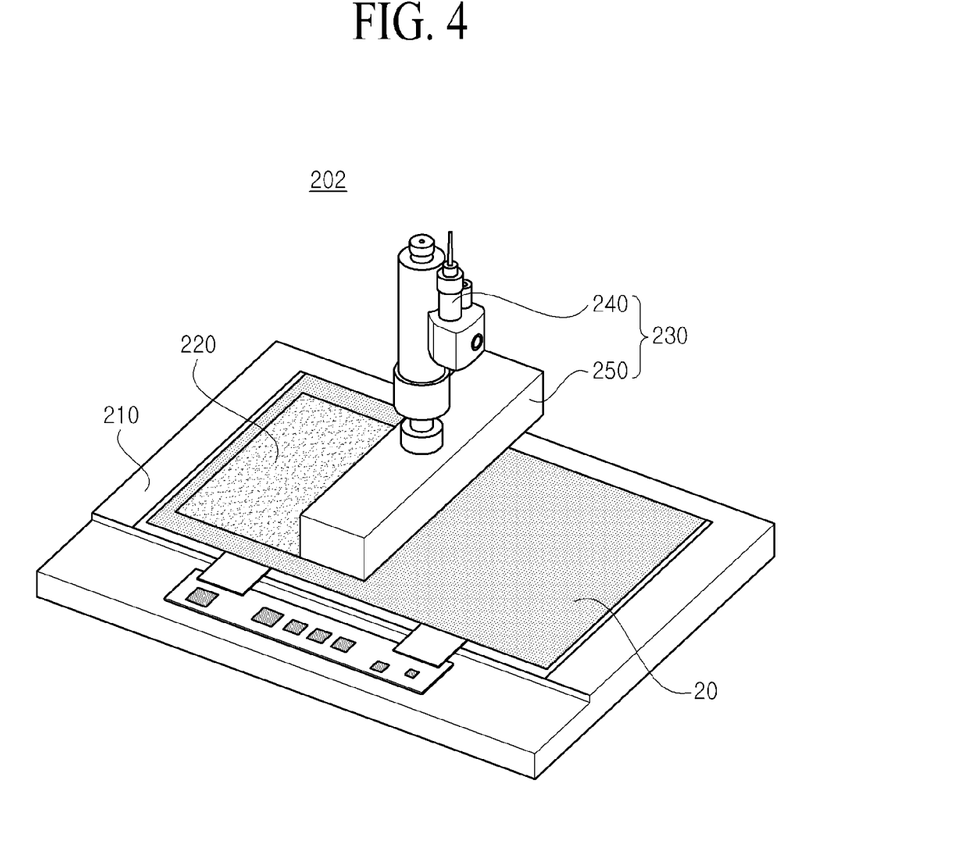
FIG. 4 is a perspective view illustrating an adhesive resin coating unit.
Figure 5:
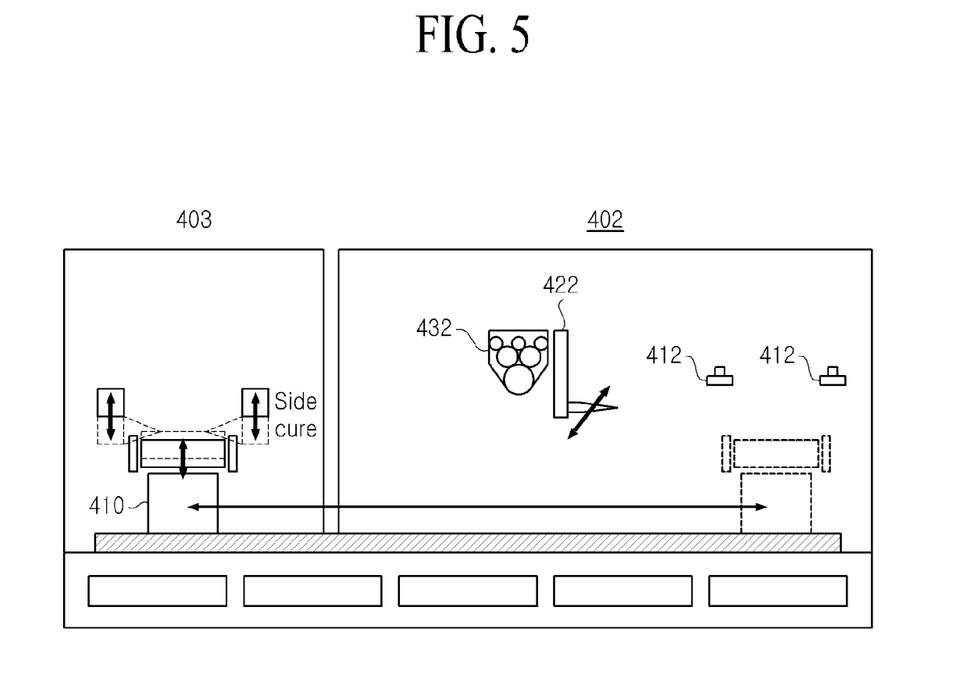
FIG. 5 is a perspective view illustrating a bonding unit and a pre-hardening unit.
Figure 6A:
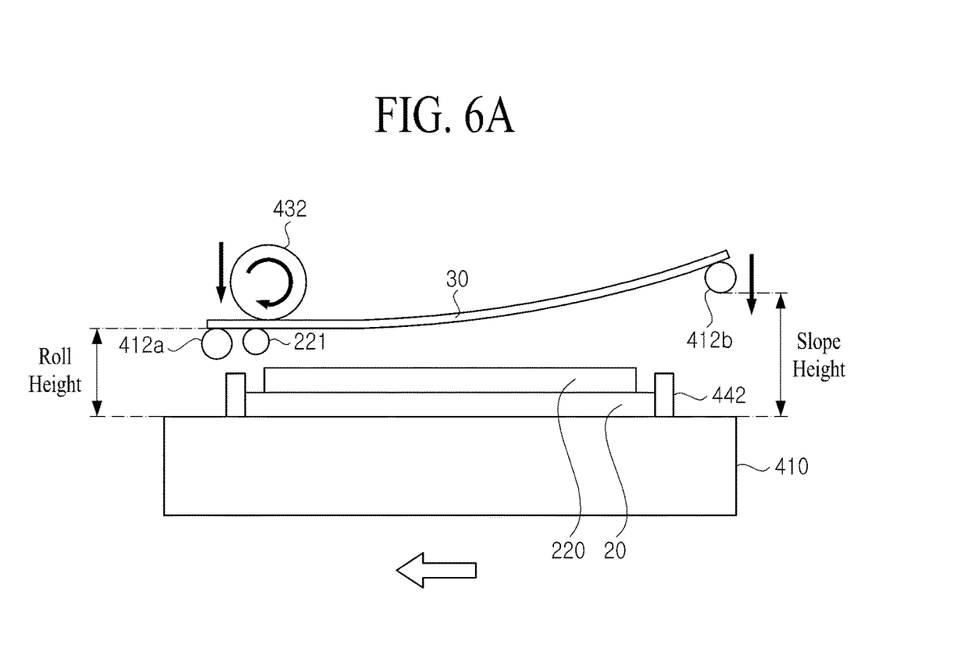
FIG. 6A is a perspective view illustrating the bonding unit.
Figure 6B:
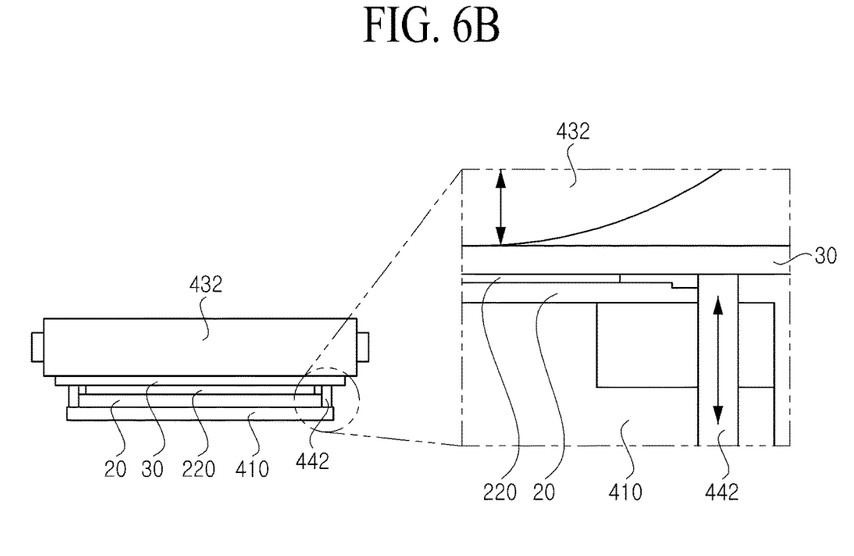
FIG. 6B is a perspective view illustrating a gap variable control stage of the bonding unit.
Figure 7:
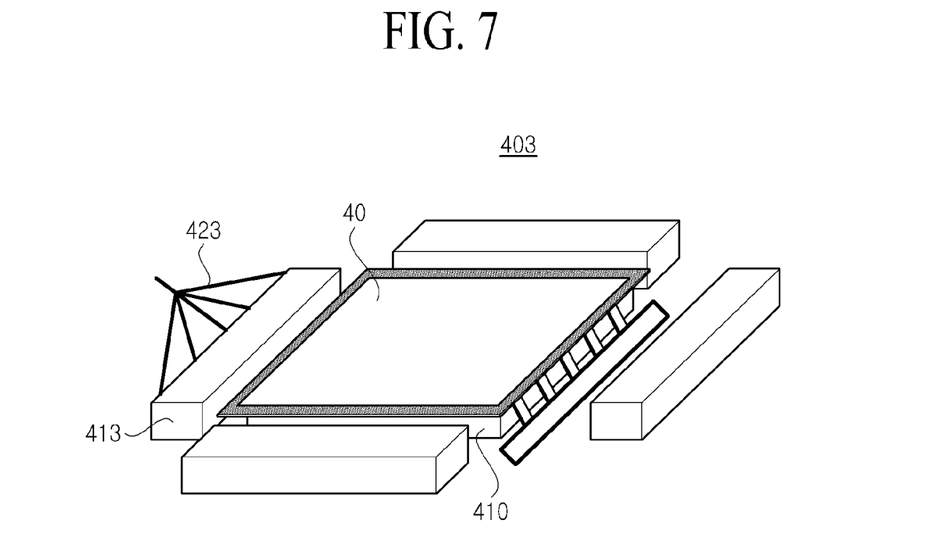
FIG. 7 is a perspective view illustrating the pre-hardening unit.
Figure 8:
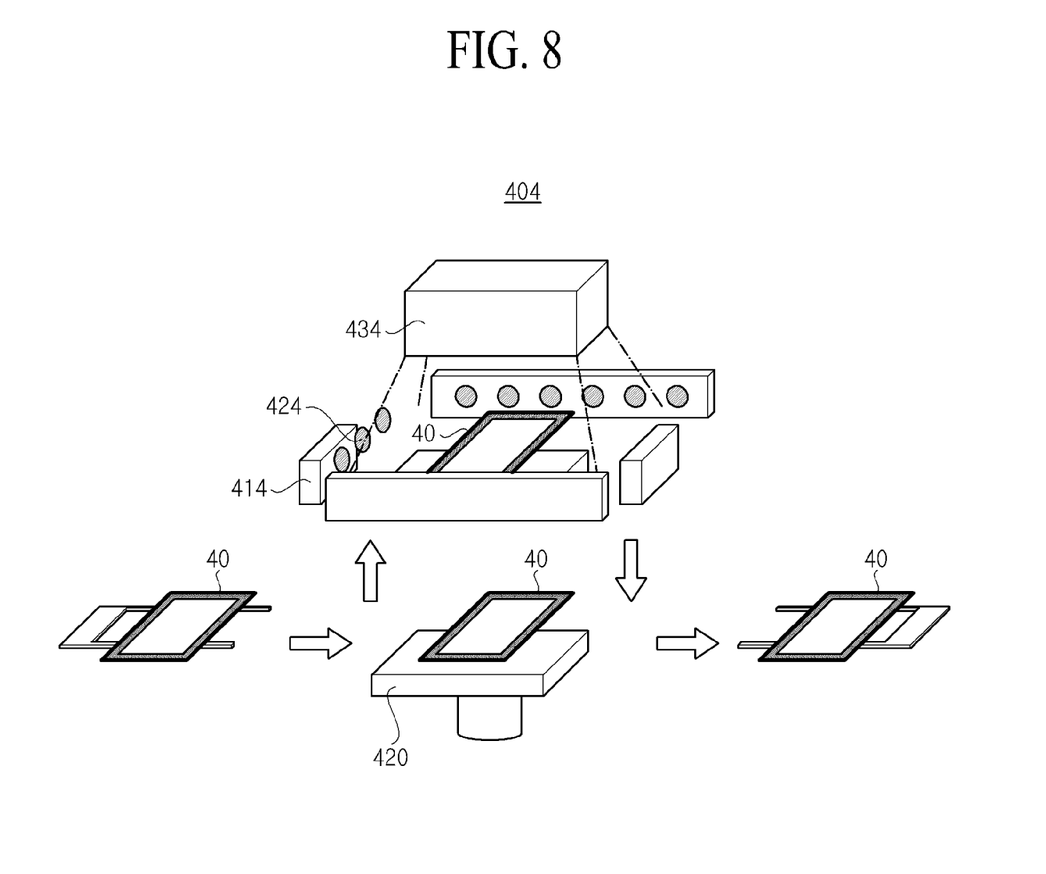
FIG. 8 is a perspective view illustrating a hardening unit.

FIG. 3 is a plan view illustrating a bonding system for the liquid crystal panel and the touch panel. FIG. 4 is a perspective view illustrating an adhesive resin coating unit. FIG. 5 is a perspective view illustrating a bonding unit and a pre-hardening unit. FIG. 6A is a perspective view schematically illustrating the bonding unit. FIG. 6B is a perspective view schematically illustrating a gap variable control stage of the bonding unit. FIG. 7 is a perspective view illustrating the pre-hardening unit. And, FIG. 8 is a perspective view illustrating a hardening unit.

As illustrated in FIG. 3, the automatic bonding system for the liquid crystal panel 20 and the touch panel 30 includes a liquid crystal panel supply unit 200, a touch panel supply unit 300, and an adhesive unit 400 that bonds the touch panel 30 to the liquid crystal panel 20. A plurality of areas for the respective elements are formed in an in-line type through a plurality of stages 210, 410 and 420 on which the liquid crystal panel 20 and the touch panel 30 are mounted.

A first loader/unloader unit 201, which supply the liquid crystal panel 20 onto a first stage 210, is disposed at the liquid crystal panel supply unit 200. A second loader unit 301, which inverts the touch panel 30 and provides the inverted touch panel 30 onto a supporter of a bonding unit, is disposed at the touch panel supply unit 300.

The adhesive unit 400 includes a bonding unit 402 (which bonds the liquid crystal panel 20 and the touch panel 30 which are respectively supplied from the liquid crystal panel supply unit 200 and the touch panel supply unit 300), a pre-hardening unit 403, a loader/unloader unit 401, a hardening unit 404, and an unloader unit 405 which are sequentially disposed on a second stage 410.

Here, the touch panel supply unit 300 is provided in the in-line type until loading of the touch panel 30, cleaning, stripping of a protective film, and measuring of a thickness are performed for the touch panel 30, and the touch panel 30 is inverted and supplied to a supporter 412 (see FIG. 5) of the bonding unit 402. The liquid crystal panel supply unit is provided in the in-line type until loading of the liquid crystal panel 20, cleaning, stripping of a protective film, measuring of a thickness, and coating of an adhesive resin are performed for the liquid crystal panel 20, and the liquid crystal panel 20 is inverted and supplied to the second stage 410.

Here, the cleaning, the stripping of the projective film, and the measuring of the thickness which are performed for the liquid crystal panel 20 and the touch panel 30 are known technology, and thus, their additional descriptions are not provided.

The adhesive unit 400 is provided in the in-line type by using the second stage 410 and a third stage 420.

To provide a more detailed description, the first loader/unloader 201 is a general element, and allows a plurality of the liquid crystal panels 20 to be sequentially supplied to the first stage 210. A second loader unit (an inverting arm) 301 is a general element, and allows a plurality of the touch panels 30 to be sequentially supplied to the supporter 412 of the bonding unit 402.

That is, the liquid crystal panel 20 is provided onto the first stage 210 by a loading robot (not shown) of the first loader unit 210. Also, the touch panel 20 is provided onto the supporter (412 of FIG. 5) of the bonding unit 402 by the loading robot (not shown) of the second loader unit 301.

Here, the first stage 210 is an element on which the liquid crystal panel 20 is disposed for coating of the adhesive resin, and the supporter (412 of FIG. 5) is an element on which the touch panel 30 is disposed for bonding the touch panel 30 to the liquid crystal panel 20.

A slit nozzle unit (230 of FIG. 4) is included in the adhesive resin coating unit 202, and coats an adhesive resin 220 on an entire surface of the liquid crystal panel 20.

Here, the adhesive resin 220 is an optical adhesive resin having an photocurable characteristic which is hardened by ultraviolet (UV), and has a high light transmittance and elasticity.

Moreover, the adhesive resin 220 is coated on an entire surface except a partial border of the liquid crystal panel 20 by using the adhesive resin coating unit 202, and does not overflow to outside the liquid crystal panel 20.

Therefore, in a process of bonding the touch panel 30 to the liquid crystal panel 20, the bonding unit 402 of the adhesive unit 400 adjusts a height of each roll 432 (see FIG. 6A) and a gap block 442 (see FIG. 6A) according to information about a coating thickness (which is measured by a laser displacement sensor (not shown) of the adhesive resin coating unit 202) of the adhesive resin 220 (see FIG. 4), thereby preventing the adhesive resin 220 from overflowing to the outside by bonding.

Accordingly, a separate cleaning process of removing the adhesive resin 220 overflowing to the outside is not performed, thereby enhancing an efficiency of a process.

When a model of the bonded liquid crystal panel 20 and touch panel 30 is changed and thus a thickness or a bonding gap is changed, the bonding unit 402 receives information about the changed thickness or bonding gap and previously adjusts a height of each of the roll 432 (see FIG. 6A) and the gap block 442 (see FIG. 6A), and thus, it is possible to respond to various models.

As illustrated in FIG. 4, the adhesive resin coating unit 202 includes an adhesive resin storage tank 240 and the slit nozzle unit 230 that includes a spray head 250 including one nozzle (not shown).

That is, the adhesive resin coating unit 202 includes the storage tank 240, which stores the adhesive resin 220 filled thereinto, and the spray head 250 that includes the nozzle (not shown) discharging the stored adhesive resin 220 to the outside. The spray head 250 is connected to the adhesive resin storage tank 240 and a supply pipe (not shown), and in more detail, the adhesive resin 220 is supplied to the nozzle (not shown) of the spray head 250 through the supply pipe (not shown) of the adhesive resin storage tank 240.

In this case, in the split nozzle unit 230, the spray head 250 scan-moves in one direction to discharge the adhesive resin 220 onto an entire surface except a partial border of the liquid crystal panel 20, thereby forming an adhesive resin layer.

That is, the spray head 250 is provided in an approximate bar type crossing an upper portion of the liquid crystal panel 20, and has a length corresponding to an edge of one side of the liquid crystal panel 20 on which the adhesive resin 220 is to be coated.

Therefore, the spray head 250 of the slit nozzle unit 230 is moved at a certain speed from one side edge to the other side edge of the liquid crystal panel 20, and simultaneously, a certain pressure is applied to the adhesive resin storage tank 240. Accordingly, the adhesive resin 220 filled into the adhesive resin storage tank 240 is discharged through the nozzle (not shown), thereby forming the adhesive resin layer on the liquid crystal panel 20.

As a result, the adhesive resin 220 is coated on an entire surface except a partial border of the liquid crystal panel 20, and thus, an adhesive resin non-charging section is not formed in an area with the adhesive resin 220 coated thereon. Accordingly, air bubbles are considerably reduced, and an efficiency of an adhesive resin coating process can be more enhanced.

The slit nozzle unit 230 includes a control unit (not shown) that precisely controls an amount of coated adhesive resin 200. The control unit precisely controls an amount and a thickness of the adhesive resin 220 coated on the liquid crystal panel 20. In detail, the laser displacement sensor measures a height of the coated adhesive resin 220 in real time, and the control unit receives the measured coating height to calculate an amount of coating. Also, the control unit transfers the coating thickness to the bonding unit 402, and allows the bonding unit 402 to adjust the roll (432 of FIG. 5) and a height of the gap block (442 of FIG. 5).

As described above, the liquid crystal panel 20 with the adhesive resin 220 coated thereon is unloaded and transferred to a buffer (not shown) by a robot (not shown) of the first loader/unloader unit 201, and then, the transferred liquid crystal panel 20 is again unloaded and transferred to the second stage 410 by a third loader/unloader unit 401 and a robot (not shown) of the adhesive unit 400. The second stage 410 with the liquid crystal panel 20 transferred thereto is transferred to under the supporter (412 of FIG. 5). The touch panel 30 is rotated by 180 degrees by an inverting arm of the second loader unit 301, and is transferred to the supporter (412 of FIG. 5) of the adhesive unit 400. Here, the inverting arm includes an absorber that absorbs a rear surface of the touch panel 30.

Therefore, the touch panel 30 and the liquid crystal panel 20 are aligned, and are bonded to each other with the adhesive resin 220 therebetween.

A bonding method will be described below with reference to FIGS. 5, 6A and 6B.

When the robot of the third loader/unloader (401 of FIG. 3) loads the liquid crystal panel 20 to the second stage 410 which stands by in the pre-hardening unit 403 of FIG. 5, the second stage 410 moves to a position under the touch panel 30 which is inverted and loaded by the supporter 412 of the bonding unit 402 of FIG. 5. For reference, the second stage 410 may move between the pre-hardening unit 403 and the bonding unit 402 through a rail, and bonding and pre-hardening of the liquid crystal panel 20 and the touch panel 30 may be all performed on the second stage 410.

Subsequently, the supporter 412 and the second stage 410 (on which the liquid crystal panel 20 and the touch panel 30 are loaded at the rightmost side in FIG. 5) are simultaneously moved to a position of a gap dispenser 422 disposed at the left in FIG. 5, and the gap dispenser 422 coats an adhesive resin (221 of FIG. 6A) on one side surface at which bonding of the touch panel 20 loaded on the supporter 412 is started. A coating method includes a method, in which one nozzle draws a line while moving, and a method in which a bar type slit nozzle applies the adhesive resin at one time. By using such a method, a contact between an adhesive resin (which is coated on the liquid crystal panel 20) and an adhesive resin (which has the same properties as those of the adhesive resin and is coated on one side surface of the touch panel 30) is started at a time when the touch panel 30 is bonded to the liquid crystal panel 20, and thus, the number of air bubbles formed at an initial bonding stage is considerably reduced, thereby decreasing a bonding defect.

A subsequent bonding method will be described with reference to a side view of FIG. 6A schematically illustrating the bonding unit and a front view of FIG. 6B schematically illustrating the bonding unit.

The gap dispenser (422 of FIG. 5) coats the adhesive resin 221 on one side surface of the touch panel 30, the second stage 410 and the supporter 412 are moved to a position of the roll 432 disposed at the left of the gap dispenser 422, and a first supporter 412a is lowered to an adhesive standby position as illustrated in FIG. 6A to cause the touch panel 30 to be inclined. Subsequently, as illustrated in FIG. 6B, the gap block 442 of the second stage is raised or lowered according to a predetermined panel thickness and bonding thickness so as to match the model of each of the liquid crystal panel 20 and the touch panel 30, thereby determining a bonding height of the touch panel 30. Also, a lowering height of the roll 432 is determined according to the predetermined panel thickness and bonding gap.

As described above, the bonding unit 402 includes the roll 432 enabling a height to be adjusted and a gap variable control stage including the gap block 442 of the second stage, and a gap may be adjusted according to a thickness of the two substrates.

The roll 432 is lowered by the determined bonding height, and bonding is started from one side surface of each of the liquid crystal panel 20 and the touch panel 30. Subsequently, a position of the lowered roll 432 is maintained in a fixed state, and the supporter 412, which supports the second stage 410 with the liquid crystal panel 20 disposed therein and the touch panel 30 so as to be inclined, moves to the pre-hardening unit 403 disposed at the left in FIG. 5. At this time, as bonding is performed, a second supporter 412b is lowered to a height of the first supporter 412a to allow a slope of the touch panel 30 to be gentle. Accordingly, bonding is performed without the touch panel 30 being damaged due to excessive bending by the roll 432.

A height of the gap block 442 and a lowering height of the roll 432 may not be set to be more thinned than a thickness of the adhesive resin 220 coated on the liquid crystal panel 20 when the touch panel 30 is bonded to the liquid crystal panel 20. Instead of a method that applies a pressure to the touch panel 30 such that the gap block 442 and the roll 432 are more thinned than a thickness of the coated adhesive resin 220, the height of the gap block 442 is set to the thickness of the adhesive resin 220 coated on the liquid crystal panel 20, and when bonding is performed by the roll 432, the bonding is performed by a surface tension in which the adhesive resin 220 coated on the liquid crystal panel 20 is raised along a bonding surface of the touch panel 30 pushed by the roll 432. Therefore, after the bonding is performed, the adhesive resin 220 does not overflow to outside the two bonded substrates.

The second stage 410, on which the bonded touch panel 30 and liquid crystal panel 20 are disposed, is transferred to the pre-hardening unit 403 disposed at the left, and a process of pre-hardening the adhesive resin 220 charged between the touch panel 30 and the liquid crystal panel 20 is performed.

Subsequently, a pre-hardening method will be described with reference to the perspective view of FIG. 7 schematically illustrating the pre-hardening unit.

The pre-hardening unit 403 includes four bar type UV hardeners 413 that irradiate UV. Each of the UV hardeners 413 includes a plurality of UV light emitting diodes (LEDs) 423. When the second stage 410 with a bonding panel 40 disposed thereon is moved to a lower portion of a space between the four bar type UV hardeners 413, the UV hardeners 413 are lowered to be respectively disposed at four edges of the bonding panel 40, and allow UV to be irradiated from the UV LEDs 423.

Therefore, a process of hardening the adhesive resin 220 charged into the bonding panel 40 is performed.

According to the present invention, since the UV LEDs 423 are respectively disposed at four side surfaces of the bonding panel 40, the UV hardeners 413 of the pre-hardening unit 403 may directly irradiate UV on respective side surfaces, thus preventing UV from being scattered and irradiating a more amount of UV than the existing method. Accordingly, a hardening rate and an efficiency of a process can increase, and the process cost can be reduced.

In detail, a mercury UV lamp or a metal halide lamp may irradiate UV, but has a service life of 1,400 to 2,000 hours which is shorter than that of the UV LED.

Therefore, the mercury UV lamp or the metal halide lamp is frequently replaced. However, by using the UV LED having a service life longer than that of the lamps, the present invention can enhance an efficiency of a process, and reduce the process cost.

Moreover, the UV LED releases lower heat and consumes lower power than the mercury UV lamp or the metal halide lamp, thus more enhancing an efficiency of a process.

The bonding panel 40 pre-hardened on the second stage 410 is again unloaded and transferred to the third stage 420 of the hardening unit 404 by the third loader/unloader 401 of FIG. 3.

Subsequently, a hardening method will be described with reference to the perspective view of FIG. 8 which illustrates the hardening unit.

The hardening unit 404 includes four bar type UV hardeners 414 that irradiate UV. Each of the UV hardeners 414 includes a plurality of UV lamps 424.

The third stage 420 of the hardening unit 404 is raised up to a height of each of the UV lamps (lamp type side UV lamps) 424 which are respectively disposed at four side surfaces of the bonding panel 40 which has been pre-hardened after bonding, and a lamp type top UV lamp 434 performs hardening along with the side UV lamps 424. When the hardening is ended, the touch panel type LCD device is finished, and the third stage 420 is lowered and unloaded by the unloader unit 405.

As described above, the automatic bonding system 100 performs the process of bonding the liquid crystal panel 20 to the touch panel 30 with the optical adhesive resin 220, and thus, bonding work of the liquid crystal panel 20 and the touch panel 30 is automated. Accordingly, a productivity increases, a bonding state is uniform and stable, and a reliability of a product is enhanced.

In addition to the process of bonding the touch panel 30 to the liquid crystal panel 20, according to the present invention, the automatic bonding system 100 may perform a process of bonding the touch panel 30 to a protective window (not shown) which performs a function of a window for protecting the LCD device from an external impact, or may perform a process of bonding the protective window to the liquid crystal panel 20.

As described above, the automatic bonding system performs the process of bonding the liquid crystal panel to the touch panel with the optical adhesive resin, and thus, bonding work of the liquid crystal panel and the touch panel is automated. Accordingly, a productivity increases, a bonding state is uniform and stable, and a reliability of a product is enhanced. In particular, panels having various thicknesses are bonded to have various gaps by using the gap block and roll of the bonding unit that adjusts the gap between the touch panel and the liquid crystal panel, and by using the gap dispenser that coats the adhesive resin on one side surface of the touch panel, the touch panel is bonded to the liquid crystal panel in a state where formation of air bubbles is minimized by a contact between the adhesive resins when the bonding process starts to be performed, thus securing the optimal process condition. Also, the coated adhesive resin can be prevented from overflowing, and thus, a separate cleaning process of removing the adhesive resin overflowing to the outside is not performed, thereby more enhancing an efficiency of a process.

Moreover, the adhesive resin coating unit scan-moves the adhesive resin to coat the adhesive resin at one time, thus more enhancing an efficiency of the adhesive resin coating process. Also, since a whole surface of the substrate is coated, an adhesive resin non-charging section is not formed, and thus, air bubbles are considerably reduced. In addition, an amount of coated adhesive resin can be precisely controlled, thus enhancing an efficiency of a process.

Moreover, by pre-hardening the adhesive resin with the UV LED, a more amount of light is irradiated than a case of using the mercury UV lamp or the metal halide lamp, and thus, a hardening rate increase, thereby increasing an efficiency of a process.

Moreover, a quality of an image can be prevented from being degraded, and an internal intensity against an external impact or pressure can be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An automatic bonding system for a liquid crystal display (LCD) device, the automatic bonding system comprising:
   a bonding unit configured to perform a process of bonding a first substrate to a second substrate;
   a first substrate supply unit configured to comprise an inverting arm, and supply the first substrate to the bonding unit;
   a second substrate supply unit configured to comprise an adhesive resin coating unit, and supply the second substrate to the bonding unit;
   a pre-hardening unit configured to perform a process of pre-hardening an adhesive resin that adheres the first and second substrates; and
   a hardening unit configured to perform a process of hardening the adhesive resin that adheres the first and second substrates,
   wherein the bonding unit comprises a gap variable control stage and supporters,
   wherein the supporters are configured to be positioned at edges of a bottom surface of the first substrate and support the first substrate,
   wherein a gap between the first and second substrates bonded to each other by the bonding unit is a bonding gap controlled by the gap variable control stage,
   wherein the gap variable control stage comprises a roll and a gap block which enable respective heights thereof to be adjusted, wherein the roll is configured to be positioned at an edge of a top surface of the first substrate unit such that bonding of the first and second substrates is initiated at one side edge of the first substrate, and
   wherein the gap block is disposed at side edges of the second substrate and is raised or lowered so that the height of the gap block is set to a thickness of the adhesive resin coated on the second substrate before bonding is performed by the roll.

2. The automatic bonding system of claim 1, wherein the gap variable control stage adjusts the bonding gap according to a size of each of the first and second substrates.

3. The automatic bonding system of claim 1, wherein in the bonding unit, the adhesive resin is raised along the first substrate by using a surface tension between the first substrate and the adhesive resin coated on the second substrate, thereby bonding the first and second substrates.

4. The automatic bonding system of claim 1, wherein the bonding unit comprises a gap dispenser configured to, before the first substrate is bonded to the second substrate, previously coat the same adhesive resin as the adhesive resin on one side surface of the first substrate to reduce air bubbles formed at a bonding timing.

5. The automatic bonding system of claim 1, wherein the pre-hardening unit comprises an ultraviolet (UV) light emitting diode (LED) configured to directly irradiate UV onto side surfaces of the bonded first and second substrates to enhance a hardening rate of the adhesive resin.

* * * * *